United States Patent
Basinski et al.

(10) Patent No.: US 11,692,751 B2
(45) Date of Patent: Jul. 4, 2023

(54) DESICCANT BAG SPACER AND CAGE

(71) Applicant: DENSO International America, Inc., Southfield, MI (US)

(72) Inventors: Jeffrey Basinski, Grand Blanc, MI (US); Jonathan Radzicki, Livonia, MI (US)

(73) Assignee: Denso International America, Inc., Southfield, MI (US)

( * ) Notice: Subject to any disclaimer, the term of this patent is extended or adjusted under 35 U.S.C. 154(b) by 195 days.

(21) Appl. No.: 17/200,101

(22) Filed: Mar. 12, 2021

(65) Prior Publication Data
US 2021/0381733 A1 Dec. 9, 2021

Related U.S. Application Data

(60) Provisional application No. 63/034,466, filed on Jun. 4, 2020.

(51) Int. Cl.
*F25B 43/00* (2006.01)
*B60H 1/32* (2006.01)
*B01D 15/10* (2006.01)
*B01D 53/04* (2006.01)
*B01D 53/26* (2006.01)

(52) U.S. Cl.
CPC .......... *F25B 43/003* (2013.01); *B01D 15/10* (2013.01); *B01D 53/0407* (2013.01); *B01D 53/261* (2013.01); *B60H 1/3229* (2013.01); *B01D 2257/80* (2013.01); *B01D 2259/4566* (2013.01); *F25B 2339/0441* (2013.01)

(58) Field of Classification Search
CPC .......... F25B 43/003; F25B 2339/0441; B01D 15/10; B01D 52/0407; B01D 52/261; B01D 2257/80; B01D 2259/4566; B01D 53/0415; B60H 1/3229
See application file for complete search history.

(56) References Cited

U.S. PATENT DOCUMENTS 6,170,287 B1   1/2001  Leitch et al.
6,474,098 B2 * 11/2002  Perrine ................. F25B 43/003
                                                                210/287
7,927,407 B2   4/2011  LeConey et al.
(Continued)

FOREIGN PATENT DOCUMENTS

DE   102018214080 A1 *  2/2019  ............. F25B 39/04
EP      1464902 A3       6/2005
GB      2483494 A   *   3/2012  ............ F25B 43/006
(Continued)

*Primary Examiner* — Emmanuel E Duke
(74) *Attorney, Agent, or Firm* — Dickinson Wright PLLC

(57) ABSTRACT

A spacer for a body of a refrigerant tank—such as a modulator—in an automotive HVAC device is provided. In embodiments, the spacer is flexible to enable it to be inserted into the modulator, and expanded out against the walls of the modulator when released therein. The spacer inhibits a desiccant bag from contacting the inner wall of the modulator, namely the location where a hole (e.g., for an inlet or outlet) is provided. The spacer can be a cage that surrounds a lower portion of the desiccant bag. And end of the desiccant bag can wrap around a flange of the cage, and be attached to the flange by mechanical fastening (e.g., through a slot), or by welding, or other means.

18 Claims, 6 Drawing Sheets

(56) References Cited

U.S. PATENT DOCUMENTS

| | | |
|---|---|---|
| 10,378,801 B2 | 8/2019 | Iio |
| 2007/0051128 A1 | 3/2007 | Perrine et al. |

FOREIGN PATENT DOCUMENTS

| JP | 2015132440 A | 7/2015 | |
| WO | 03089852 A1 | 10/2003 | |
| WO | WO-2012030063 A1 * | 3/2012 | .............. F25B 39/04 |

\* cited by examiner

DESICCANT BAG SPACER AND CAGE

CROSS-REFERENCE TO RELATED APPLICATIONS

This application claims the benefit of U.S. provisional application Ser. No. 63/034,466 filed Jun. 4, 2020, the disclosure of which is hereby incorporated in its entirety by reference herein.

TECHNICAL FIELD

The present disclosure relates to a desiccant bag spacer and cage for an automotive heating, ventilation, and air conditioning (HVAC) system. Various embodiments of a desiccant bag spacer and desiccant bag cage are described herein.

BACKGROUND

A cooling circuit used in, for example, a vehicle air-conditioning unit is configured to circulate a refrigerant in passages that extend through an evaporator, a condenser, or the like. Typically, a receiver drier is provided in which refrigerant circulates. The receiver drier is configured to temporarily store the refrigerant to separate vapor refrigerant from liquid refrigerant. A desiccant within a bag ("desiccant bag") may be located within the receiver drier for removing water from the refrigerant.

SUMMARY

In an embodiment, a receiver drier assembly for an automotive HVAC system includes a modulator having a tubular interior surface, the modulator having an inlet configured to receive fluid and an outlet configured to expel fluid; a desiccant bag disposed within the modulator; and a desiccant bag cage secured about a portion of the desiccant bag, wherein the desiccant bag cage prevents the portion of the desiccant bag from contacting the interior surface of the modulator.

In an embodiment, a receiver drier assembly for an automotive HVAC system includes a modulator having a tubular interior surface, the modulator further having an inlet and an outlet; a desiccant bag disposed within the modulator; a cap assembly disposed within the modulator and including a filter, wherein the cap assembly is aligned with the outlet; and a spacer supported by the cap assembly within the modulator, wherein the spacer is aligned with the inlet, and wherein the spacer inhibits the desiccant bag from being aligned with the inlet.

In an embodiment, a method of assembling a receiver drier for an automotive HVAC includes: brazing or welding a thread within a modulator; then inserting a desiccant bag through the thread and into the modulator; then inserting a compressed spacer through the thread and into the modulator; then allowing the compressed spacer to expand within the modulator; and then inserting a plastic cap assembly through the thread.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Terms such as "leading," "front," "forward," "rearward," "top," "bottom," "upper," "lower," etc. may be used in this disclosure. These terms are for giving positional context of various components relative to a vehicle in which the heat exchanger resides. For example, the leading or front edge of a component is one that is forward-most in the direction of the front of the vehicle (e.g., the vehicle grille). Moreover, unless otherwise noted, directional terms are used in context to the Figures that they describe, relative to the orientation of the Figure and should not limit the structure to only the directional term. These are merely exemplary words used in context of the orientations shown in the Figures.

Figure 1:
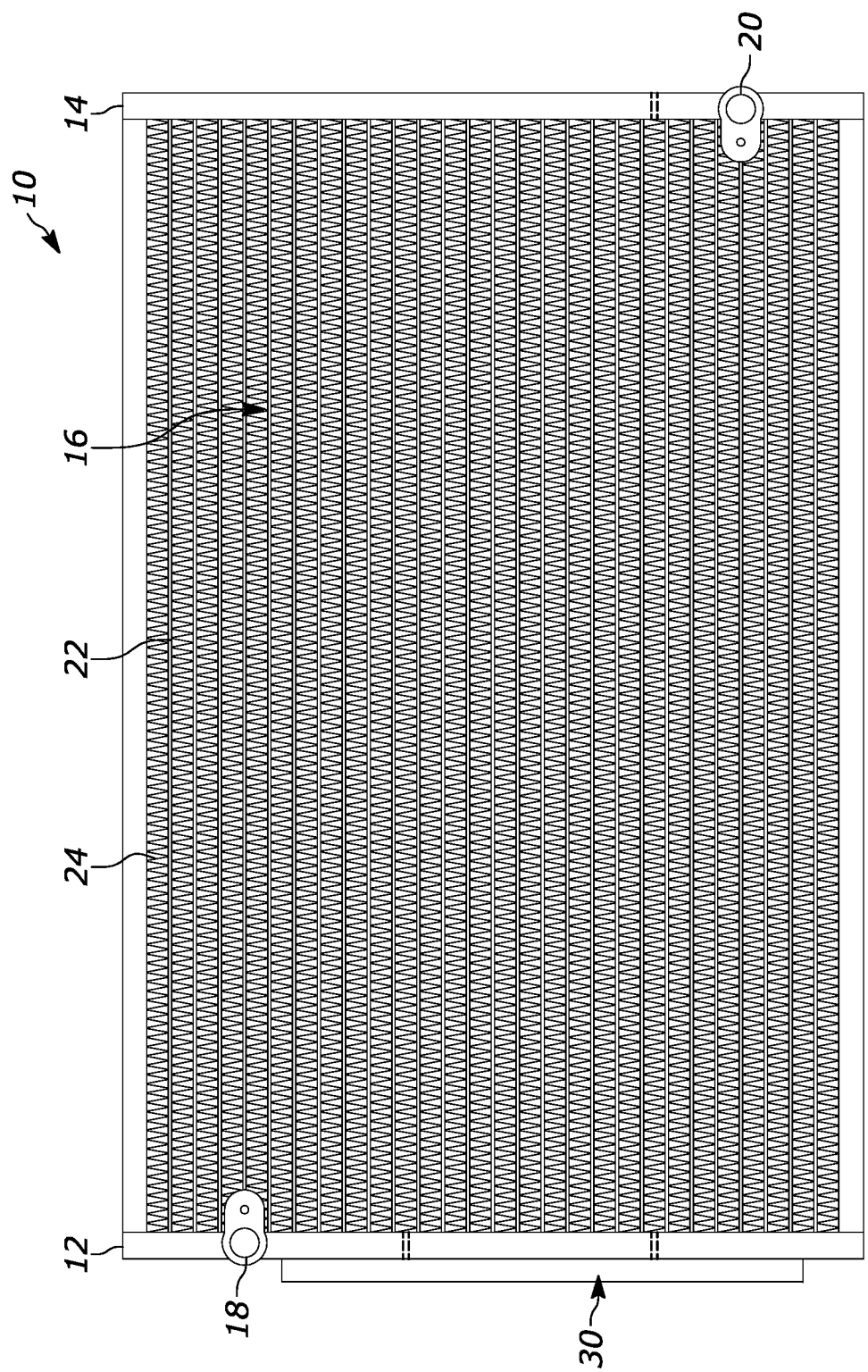
FIG. 1 is a front view of a heat exchanger, according to an embodiment.

FIG. 1 shows a front view of a radiator 10 according to one embodiment. The radiator is but one type of heat exchanger that the teachings of this disclosure can be applied to, but for the sake of brevity, only a radiator is illustrated. The heat exchanger could also be a condenser, oil cooler, or other heat exchangers known to be located in front of an engine of an automobile (e.g., car, truck, van, sports utility vehicle, etc.). The radiator 10 includes an inlet header tank 12, an outlet header tank 14, and a core 16 disposed between the inlet header tank 12 and the outlet header tank 14. The inlet header tank 12 defines an inlet 18 through which the coolant enters the radiator 10, and the outlet header tank 14 defines an outlet 20 through which the coolant exits the radiator 10. While the inlet 18 and outlet 20 are shown to exist in opposite header tanks, in other embodiments the inlet is above the outlet in the same header tank. The core 16 includes a plurality of tubes 22 and a plurality of fins 24 which extend between the inlet header tank 12 and the outlet header tank 14. The tubes 22 fluidly connect the inlet 18 to the outlet 20. The tubes 22 and the fins 24 are arranged in parallel in an alternating pattern such that adjacent tubes 22 are connected in parallel via a fin 24.

Coolant from the engine, which may either be a liquid or gaseous phase, flows from the inlet header tank 12, through the core 16, and to the outlet header tank 14. The core 16 cools the coolant flowing through the radiator 10. More specifically, the coolant flows through the tubes 22, and the fins 24 conduct or transfer heat from the coolant flowing through the tubes 22. Heat transferred to the fins 24 is transferred to air flowing through the radiator 10. The air flowing through the radiator can be supplied naturally when the vehicle is traveling, or via a fan (not shown).

The radiator 10 may also include or be coupled with a receiver drier assembly 30 (also referred to as a modulator assembly). The receiver drier assembly 30 is shown according to one embodiment in FIG. 2, and arrow 30 in FIG. 1 denotes the general location of the receiver drier according to an embodiment. The receiver drier assembly 30 stores the coolant and removes moisture and dissimilar substances contained in the coolant. The receiver drier assembly 30 is directly coupled to or within the inlet header tank 12. However, in other embodiments, the receiver drier assembly 30 may be directly coupled to or within the outlet header tank 14. As the coolant flows through one of the header tanks (in this embodiment, the inlet header tank 12), some of the coolant flows through the receiver drier assembly 30 where the coolant can be filtered and desiccated.

Figure 2:
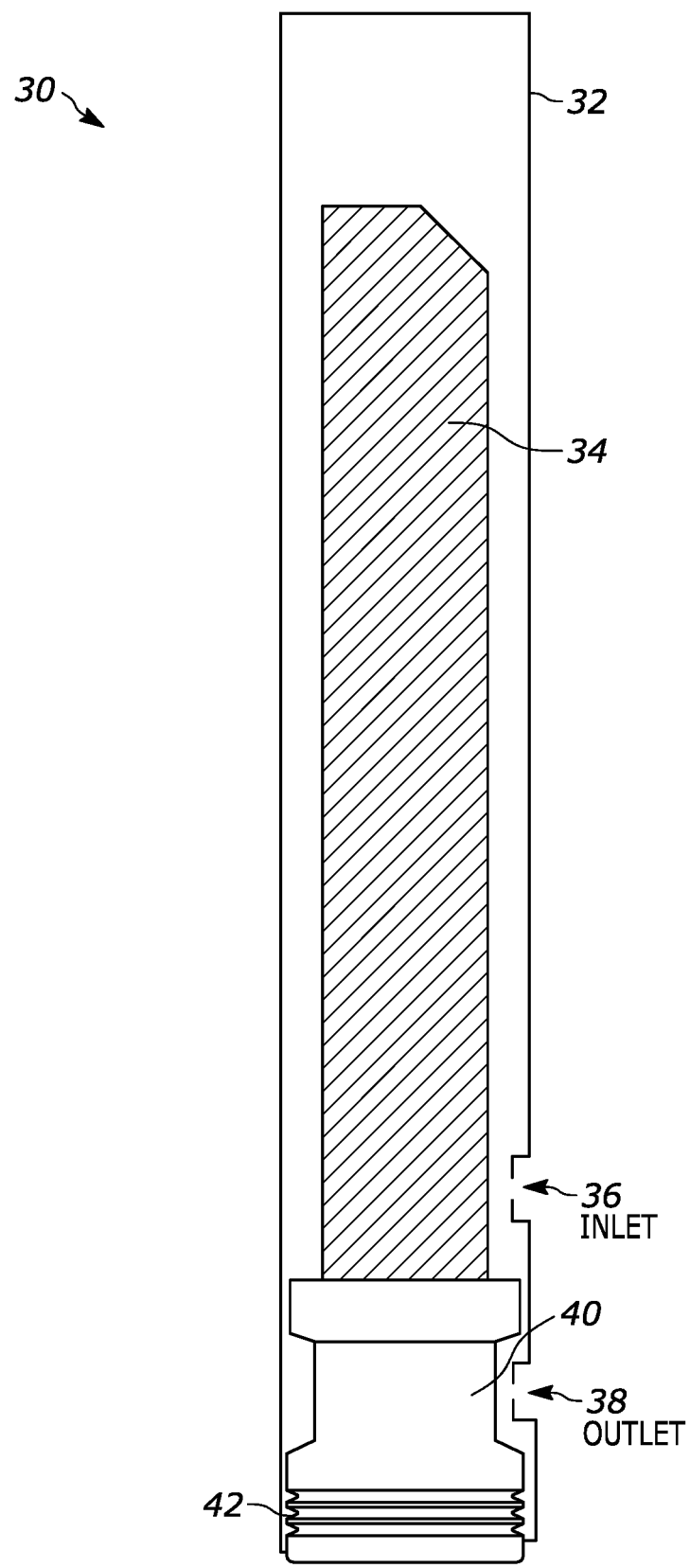
FIG. 2 is a front cross-sectional view of a receiver drier with a desiccant bag therein, according to an embodiment.

Referring to the embodiment illustrated in FIG. 2, the receiver drier assembly 30 include a modulator 32 (also referred to as a main body, a shell, or a housing) that is a hollow cylindrical tube that surrounds and contains a desiccant bag 34. The modulator 32 is fluidly coupled to one of the header tanks (in this embodiment, the inlet header tank 12) to receive the coolant therefrom. In one embodiment, the lower portion of the modulator 32 includes an inlet 36 and outlet 38. The inlet 36 and outlet 38 may be holes or apertures that are bored or drilled into the modulator 32. The inlet 36 is configured to receive the coolant from the inlet header tank 12, and the outlet 38 is configured to send the coolant to the inlet header tank 12. The desiccant bag 34 is located above a cap assembly 40. As the coolant flows from the inlet 36 to the outlet 38, the coolant can be stored in the desiccant bag 34 and/or filtered by passing through a filter in the within the cap assembly 40 before.

The cap assembly 40 can be assembled to the modulator 32 of the receiver drier assembly 30 by various methods. In one embodiment, the cap assembly 40 includes an outer thread (e.g., made of metal such as aluminum) which is brazed, soldered, or otherwise fixed to the inner wall of the modulator 32. In another embodiment, the inner wall of the modulator 32 may be provided with threads, and the outer surface of the cap assembly 40 may include corresponding threading configured to engage the threading of the modulator 32. The cap assembly 40 may also an outer surface having include annular grooves 42 configured to receive seals (e.g., O-rings) to assure that when the cap assembly 40 is installed within the modulator 32, coolant does not leak out of the receiver drier assembly 30 through the interface between the cap assembly 40 and the modulator 32.

When the desiccant bag 34 is properly installed within the receiver drier assembly 30, the desiccant bag 34 may be allowed to contact the inner surfaces of the modulator 32. However, this may case inadvertent damage to the desiccant bag 34. In particular, burrs or other surface roughness can exist on the inner surface of the modulator 32 as a result of the cutting or material removal process employed when forming the inlet 36 and/or outlet 38, for example. As shown in FIG. 2, a bottom portion of the desiccant bag 34 may be aligned with the inlet 36 after assembly and can therefore inadvertently contact any burrs that may be present in the region of the inlet 36. This can slowly tear a hole or otherwise damage the desiccant bag 34 over time.

Therefore, according to various embodiments described herein, a desiccant bag spacer and/or a desiccant bag cage may be utilized. As will be described below with reference to FIGS. 3-7, a desiccant bag spacer may support the desiccant bag 34 from beneath and keep the desiccant bag 34 in a raise position relative to the inlet 36, preventing the desiccant bag 34 from contacting any burrs that may be present at the inlet 36. In other embodiments, a desiccant bag cage may be provided about the lower portion of the desiccant bag 34. The desiccant bag 34 may be aligned with the inlet 36 (as shown in FIG. 2, for example), but the desiccant bag cage can protect the desiccant bag 34 by spacing the desiccant bag 34 from the inner walls of the modulator 32.

Figure 4:
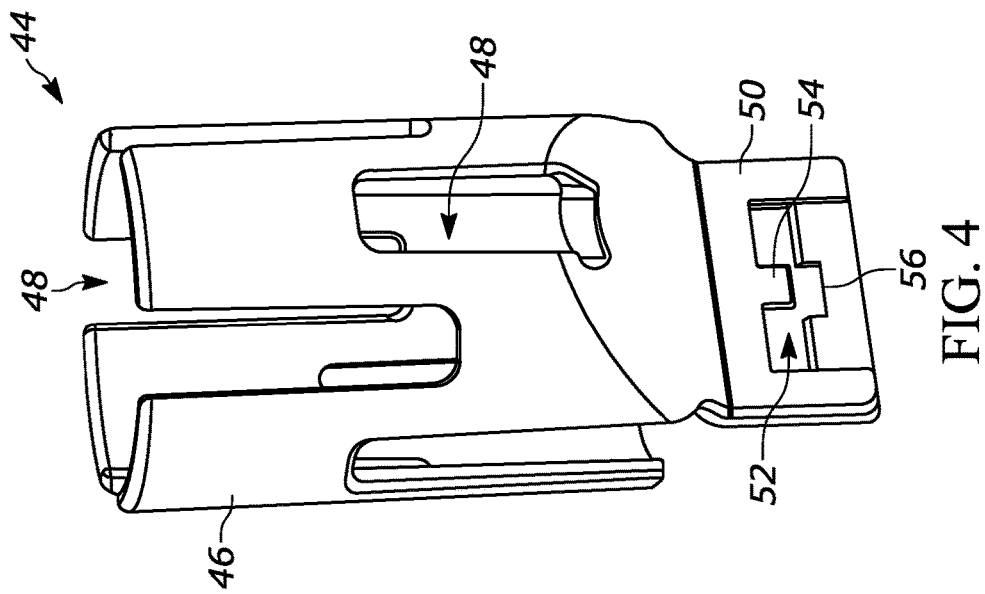
FIG. 4 is a perspective view of the desiccant bag cage, according to an embodiment.
Figure 3:
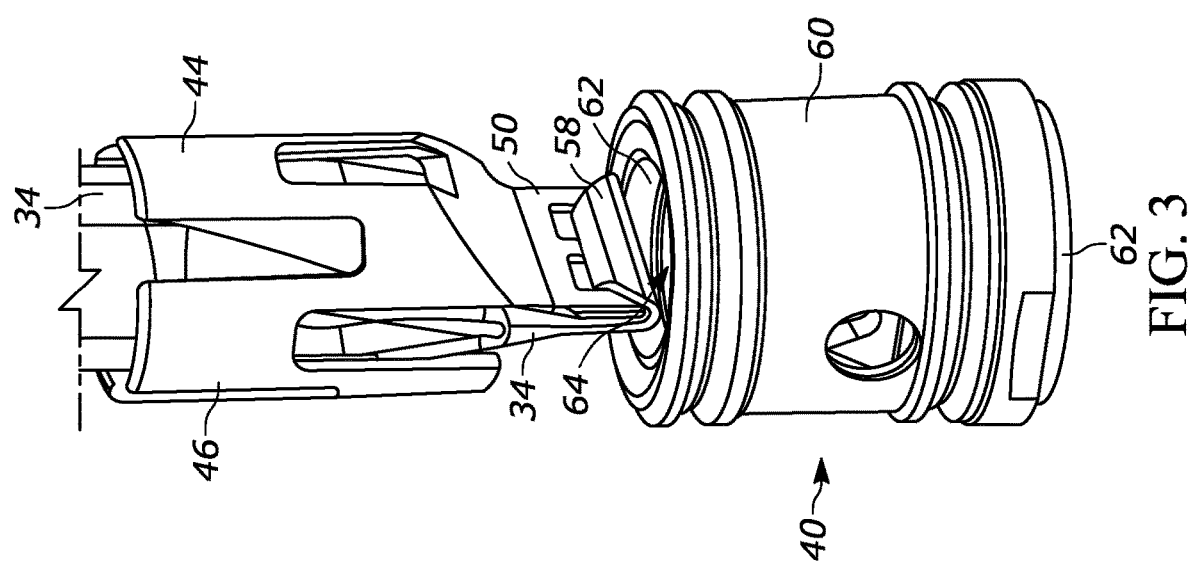
FIG. 3 is a perspective view of a desiccant bag cage about a desiccant bag and resting above a cap, according to an embodiment.

FIGS. 3-4 illustrate a desiccant bag cage 44 according to one embodiment. The desiccant bag cage 44 may be made of plastic, for example. FIG. 3 shows the desiccant bag cage 44 containing a lower portion of the desiccant bag 34 therein and resting above the cap assembly 40, while FIG. 4 shows the desiccant bag cage 44 in isolation. The desiccant bag cage 44 includes main body 46 that is generally cylindrical with an inner diameter that exceeds an outer diameter of the desiccant bag 34 contained therein. The main body 46 may have a plurality of openings 48 (such as grooves, slots, apertures, or the like) formed therein. The openings 48 can improve the flexibility of the desiccant bag cage 44 and also save on material usage.

The desiccant bag cage 44 may terminate in a flange 50. The flange 50 may have a toothed slot 52 extending therethrough. The toothed slot 52 is an opening, and provides a place for the end of the desiccant bag 34 to attach. In particular, the flange 50 has a projection (e.g., tooth) 54 extending downward into the slot 52, and the slot may have a corresponding notch 56 vertically aligned with the projection 54. To assemble the desiccant bag 34 to the desiccant bag cage 44, an end 58 of the desiccant bag 34 may be wrapped around the underside of the flange 50, and inserted into the toothed slot 52. The combination of the projection 54 and the notch 56 help fix the desiccant bag 34 to the desiccant bag cage 44.

The end 58 of the desiccant bag 34 being wrapped under the flange 50 also provides a cushion for contacting the underlying cap assembly 40 (e.g., plug or filter within the cap assembly 40). In particular, the cap assembly 40 may include an outer thread 60 that is configured to be brazed or soldered to an inner surface of the modulator 32, as explained above. A plug 62 (made of plastic or rubber, for example) may be inserted within the outer thread 60. An upper region of the plug 62 may be equipped with a filter 64 or mesh component configured to filter contaminants that might be traveling within the fluid. The end 58 of the desiccant bag 34 (which is made of felt or fabric, for example) being wrapped under the flange 50 can make contact with either the plug 62 or the fitted filter 64 or mesh component, providing a softer engagement than if the more rigid material of the desiccant bag cage 44 were to contact the plug 62 or fitted filter 64 or mesh component directly. In other words, the desiccant bag 34 can directly contact the plug 62 or filter 64 instead of the desiccant bag cage 44, while the desiccant bag cage 44 prevents the desiccant bag 34 from contacting the inner wall of the modulator 32.

Figure 5:
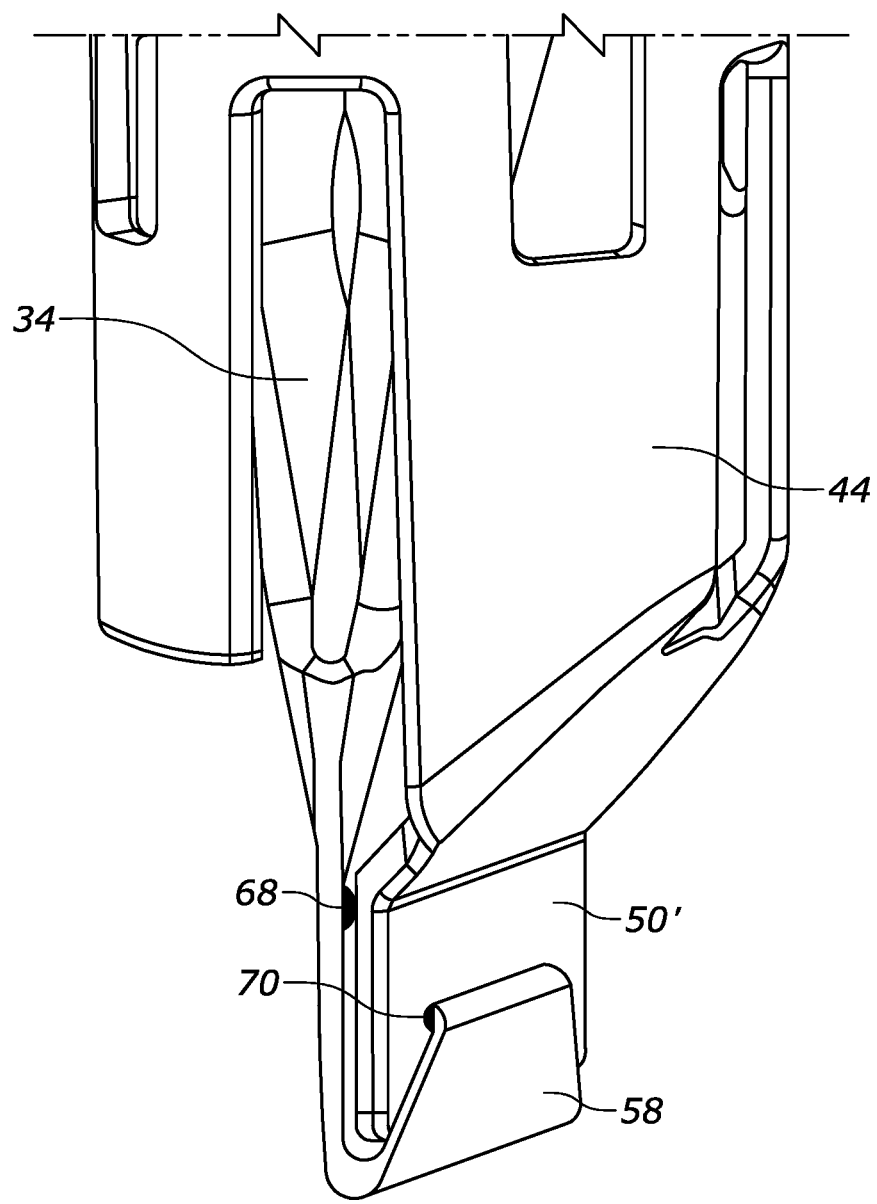
FIG. 5 is a perspective view of a portion of a desiccant cage about a desiccant bag, according to another embodiment.

FIG. 5 illustrates the desiccant bag cage 44 according to another embodiment. The desiccant bag cage 44 has similar structure as shown and described with reference to FIGS. 3-4, except a change in the flange. In particular, the desiccant bag cage 44 has a flange 50' that does not include the toothed slot 52. Instead, the flange 50' may be a solid, planar structure with no apertures. The flange 50' provides area for attachment of the desiccant bag 34. The desiccant bag 34 may be ultrasonically welded to the flange 50'. For example, a first ultrasonic weld 68 may be provided between the desiccant bag 34 and a first side of the flange 50'. The end 58 of the desiccant bag 34 may be wrapped around the flange 50', and a second ultrasonic weld 70 may be provided between the desiccant bag 34 and a second side of the flange 50'. Again, the wrapping of the end 58 of the desiccant bag 34 provides a cushion between the desiccant bag cage 44 and the underlying components, such as the plug 62 or filter 64 as explained above.

In FIG. 5, the end 58 of the desiccant bag 34 is shown to be covering only a portion of the flange 50'. It should be understood that this is merely exemplary. In other embodiments, the end 58 of the desiccant bag 34 may be wrapped completely around the flange 50', covering both sides of the flange 50'. Moreover, in other embodiments, the flange 50 or 50' is not provided at all, and the desiccant bag 34 wraps around another portion of the desiccant bag cage 44. In such an embodiment, the desiccant bag can wrap around the open bottom of the desiccant bag cage 44 and attach to the outer surface thereof.

It should also be understood that ultrasonic welding is but one example of attaching the desiccant bag 34 to the desiccant bag cage 44. In other embodiments, adhesives such as glues, interference fits, pins, rivets, and co-molding may be used at, for example, the locations where the ultrasonic welds 68, 70 are illustrated in FIG. 5.

By using the desiccant bag cage 44 described herein, the desiccant bag 34 can remain floating free above the underlying structure, such as the plug 62 or filter 64. The desiccant bag cage 44 need not be sealed or secured to the modulator 32, and can simply be attached to the desiccant bag 34 via the methods described herein. The desiccant bag 34 can extend through the desiccant bag cage 44, and wrap around a bottom surface of the desiccant bag cage 44 to prevent the desiccant bag cage 44 from directly contacting the underlying plug 62 or filter 64.

Figure 6:
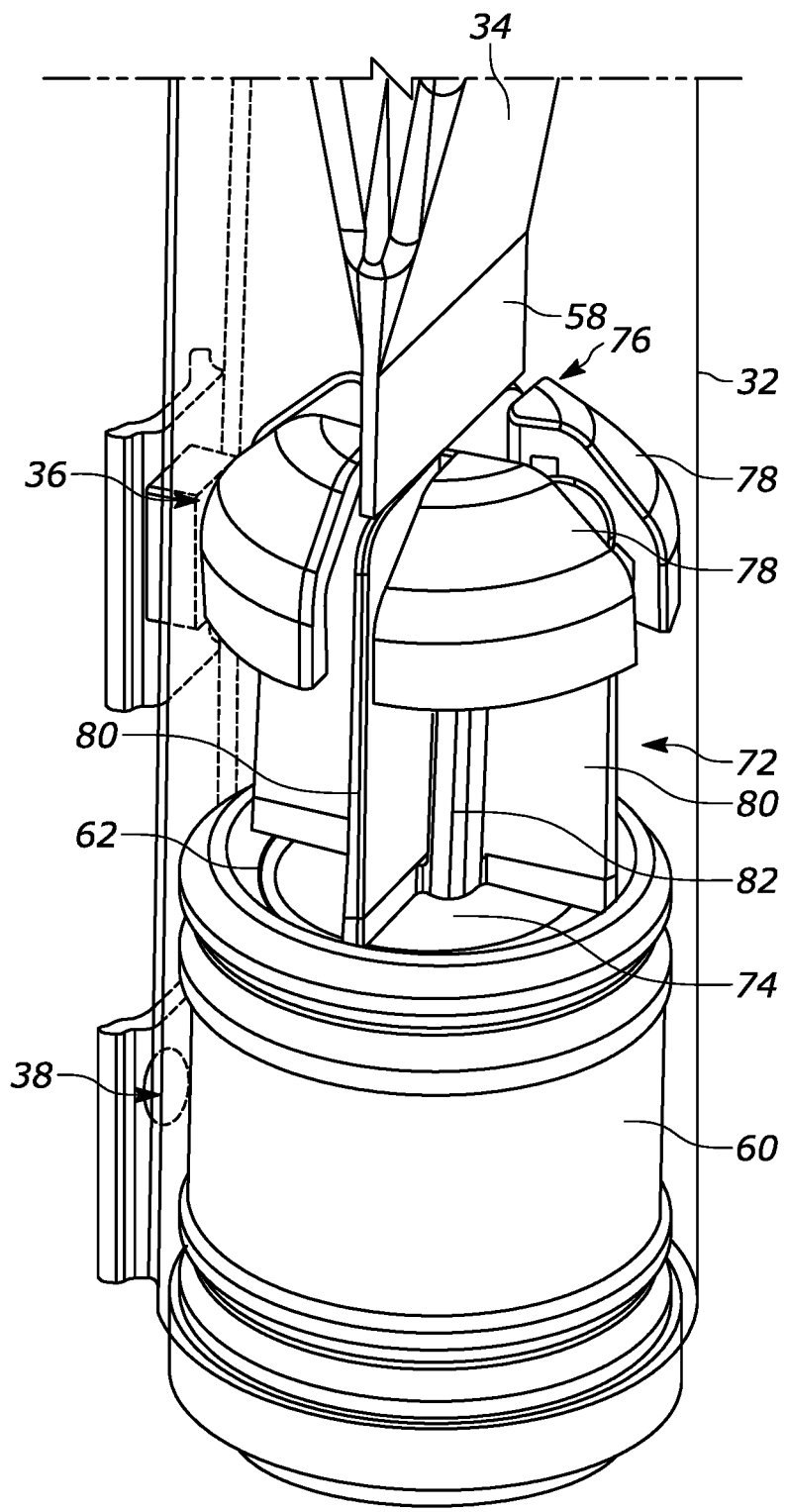
FIG. 6 is a perspective view of a desiccant bag spacer resting above a cap, according to an embodiment.

FIG. 6 illustrates another embodiment of spacing the desiccant bag 34 from the underlying structure, such as the plug 62 or filter 64. In this embodiment, a spacer 72 is utilized for this purpose. The spacer 72 separates and spaces the end 58 of the desiccant bag 34 from the thread 60, which surrounds the plug 62 and filter 64 described above. The spacer 72 may rest on a cap 74 located at the upper end of the plug 62. In other embodiments, the spacer 72 may rest directly on the filter 64 or mesh material, or the thread 60, or any other suitable structure located within the modulator 32.

As will be described further below, the spacer 72 may be assembled by inserting it through the thread 60. Therefore, the spacer 72 may be flexible or compressible to enable it to be properly inserted through the thread 60. In other words, the spacer 72 may have an outer diameter that exceeds the inner diameter of the thread 60 when the spacer 72 is unbiased or uncompressed. To enable compression of the spacer 72, the spacer 72 may have a head 76 having a plurality of head segments 78. The head segments 78 may be separated from one another by a gap. Moreover, the spacer 72 may be made of a flexible rubber or the like, allowing a person to easily, by hand, squeeze or compress the head segments 78 closer together to shrink the outer diameter of the head 76. The head segments 78 may be beveled or curved to facilitate assembly that will be described later.

A plurality of fins 80 may also be provided, with each fin 80 being located between a pair of adjacent head segments 78. The fins 80 may be connected to each other by a center shaft 82. The fins 80 may act as springs, being able to compress toward the center of the center shaft 82 along with the head segments 78. When the spacer 72 is released by the user, the fins 80 and head segments 78 may return to their non-compressed, normal configuration that is shown in FIG. 6. The fins 80 also provide a point of contact for the spacer 72. For example, in the embodiment shown in FIG. 6, the fins 80 and center shaft 82 contact the underlying cap 74 (or other structure, such as filter 64), allowing the spacer 72 to rest on and be supported from beneath by the cap 74.

The spacer 72 is sized such that the head segments 78 may be aligned with the inlet 36. Therefore, any burrs or other irritants located at the surface of the modulator 32 from the manufacturing of the inlet 36 (as described above) will not be aligned with the desiccant bag 34. The desiccant bag 34 can rest on the head 76 at a location higher than the inlet 36, thereby preventing the desiccant bag 34 from rubbing against any burrs at the inlet 36.

The receiver drier assembly shown in FIG. 6 can be assembled as follows. First, the thread 60 may be inserted into the hollow modulator 32. The thread 60 may be brazed, welded, or otherwise fixed within the modulator 32. As shown in FIG. 6, the thread 60 may extend slightly beyond the bottom of the modulator 32. Then, the desiccant bag 34 can be inserted through the thread 60 and into the modulator 32, from the bottom of the modulator 32. Then, the spacer 72 can be compressed or squeezed so that its outer diameter is reduced compared to its normal resting outer diameter. With the spacer 72 compressed or squeezed as such, the spacer 72 is inserted through the thread 60 and into the modulator 32. Once the spacer 72 travels up and beyond the location of the thread 60, the spacer 72 can expand to its normal, uncompressed state (or to a state that is less compressed then when it is being inserted through the thread 60). Thereafter, a cap assembly (which can include cap 74, plug 62, fitted filter 64 or mesh component, and the like) may be inserted and installed into the thread 60. The spacer 72 is thus located on top of the spacer assembly, and separates the desiccant bag 34 from the inlet 36 and the cap assembly.

In one embodiment, the internal diameter of the thread 60 is 25 millimeters (mm), and the inner diameter of the modulator 32 is 31 mm. The outer diameter of the spacer 72 in a normal, uncompressed state may be 31 mm, or slightly larger (e.g., between 32-35 mm). In general, the spacer 72 may have an outer diameter that is larger than the inner diameter of the thread 60, and equal to or slightly larger than the inner diameter of the modulator 32.

Figure 7:
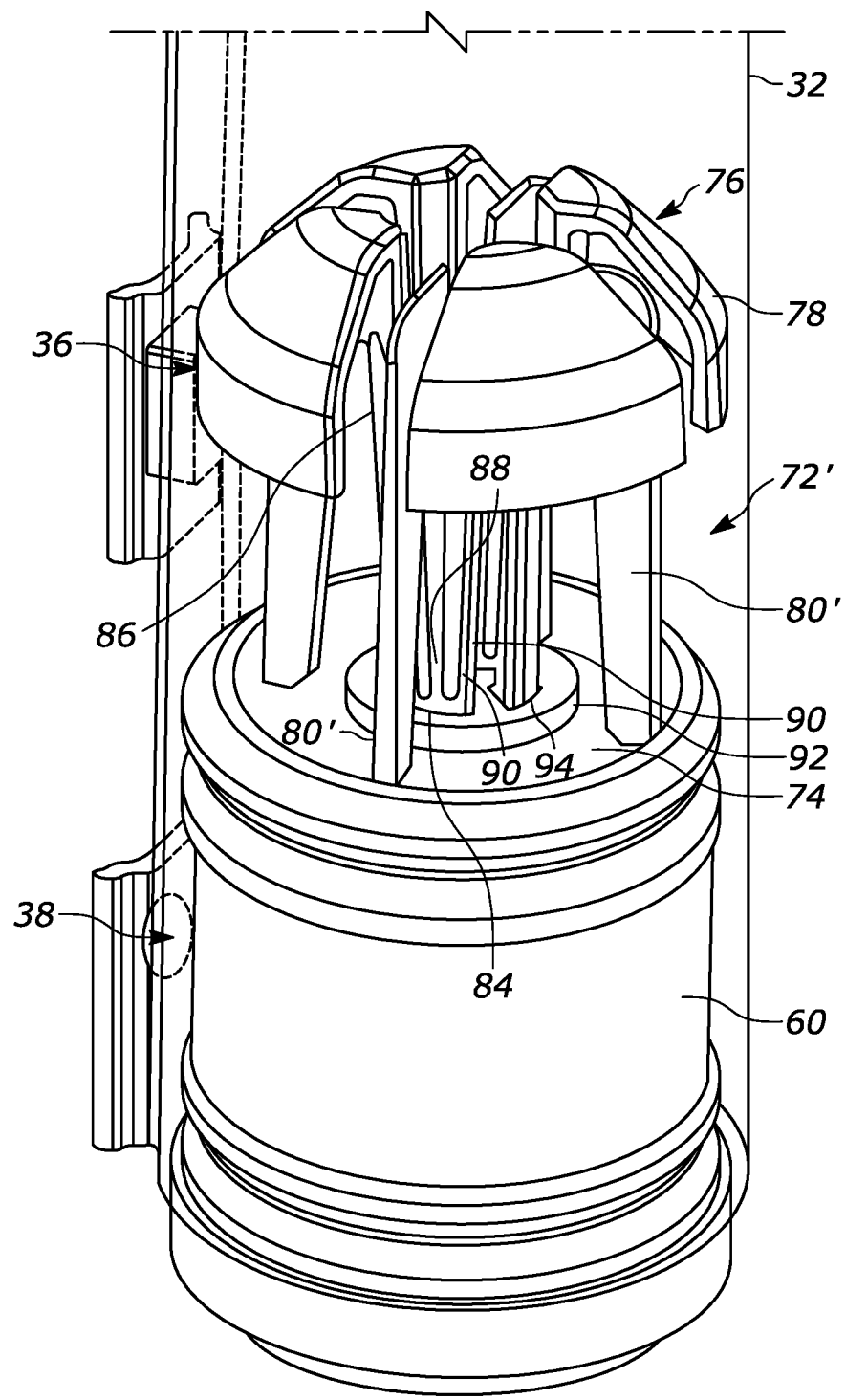
FIG. 7 is a perspective view of a desiccant bag spacer resting above a cap, according to another embodiment.

FIG. 7 illustrates another embodiment of a spacer 72'. A cap (such as cap 74 in FIG. 6) has been removed for illustrative purposes. The spacer 72' is installed in the same fashion as the spacer 72 of FIG. 6. And, the spacer 72' provides the same function as the spacer 72 of FIG. 6. Namely, the spacer 72' separates and spaces the end of the desiccant bag from the thread 60, which surrounds the plug 62 and filter 64 described above. The spacer 72' may rest on a cap 74 for example. In other embodiments, the spacer 72' may rest directly on the filter or mesh material, or the thread 60, or any other suitable structure located within the modulator 32.

Rather than having a single, solid center shaft (such as center shaft 82 in FIG. 6), the spacer 72' has a plurality of legs 84 surrounding its center. In the illustrated embodiment, there are four legs 84, although more or less legs can be provided. Each leg 84 can have three connected leg members, such as first leg member 86, second leg member 88, and third leg member 90. The three leg members 86-90 extend upwardly and outwardly in a trident fashion from the point of connection of the leg members, which rests on the cap 74. The first leg member 86 extends to one of the head segments 78, and the third leg member 90 extends to an adjacent one of the head segments 78. The second leg member 88, being located between the first leg member 86 and third leg member 90, extends to one of the fins 80' located between the two adjacent head segments 78. In other words, two adjacent head segments 78 and an intermediate fin 80' can converge to form a single leg 84.

A ring 92 may also be provided. The ring 92 has a plurality of openings 94, wherein each opening 94 is sized and configured to fit about a corresponding one of the legs 84. The ring 92 can be utilized to collapse or constrict the head segments 78 and the fins 80'. In particular, a user can slide the ring 92 upward along the legs 84, which causes the space between the leg members 86-90 to constrict, thereby causing the head segments 78 and fins 80' to move closer to the center. This procedure can allow a technician to move the ring 92 upwards to constrict the spacer 72', thereby allowing the spacer 72' to be removed through the bottom of the thread 60 and modulator 32.

As described here, the desiccant bag cage 44 provides spacing between the desiccant bag 34 and the inner wall of the modulator 32. Therefore, it can be said that the desiccant bag cage 44 is also a spacer. While the desiccant bag cage 44 of FIGS. 3-5 spaces the desiccant bag 34 from the surface of the modulator 32, the desiccant bag spacers 72 and 72' of FIGS. 6-7 space the desiccant bag 34 vertically from the cap assembly 40, therefore removing the desiccant bag 34 from alignment with the inlet 36.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A receiver drier assembly for an automotive HVAC system, the receiver drier assembly comprising:
    a modulator having a tubular interior surface, the modulator having an inlet configured to receive fluid and an outlet configured to expel fluid;
    a desiccant bag disposed within the modulator; and
    a desiccant bag cage secured about a portion of the desiccant bag, wherein the desiccant bag cage prevents the portion of the desiccant bag from contacting the interior surface of the modulator;
    wherein the desiccant bag cage includes a main body and a flange extending outwardly from the main body, wherein the desiccant bag is secured to the flange.

2. The receiver drier assembly of claim 1, wherein the flange includes a toothed slot, and the desiccant bag is wrapped about the flange and extends through the toothed slot to secure the desiccant bag to the flange.

3. The receiver drier assembly of claim 1, wherein a portion of the desiccant bag is wrapped about at least a portion of the flange.

4. The receiver drier assembly of claim 3, wherein the flange includes a first surface and an opposing second surface, wherein the desiccant bag is welded to the first surface and to the second surface.

5. The receiver drier assembly of claim 3, further comprising a cap assembly disposed within the modulator, wherein the portion of the desiccant bag contacts the cap assembly such that the flange does not directly contact the cap assembly.

6. The receiver drier assembly of claim 1, wherein the main body is cylindrical and is configured to receive the portion of the desiccant bag therein.

7. The receiver drier assembly of claim 1, wherein the desiccant bag cage includes a plurality of openings formed therein.

8. A receiver drier assembly for an automotive HVAC system, the receiver drier assembly comprising:
    a modulator having a tubular interior surface, the modulator further having an inlet and an outlet;
    a desiccant bag disposed within the modulator;
    a cap assembly disposed within the modulator and including a filter, wherein the cap assembly is aligned with the outlet; and
    a spacer supported by the cap assembly within the modulator, wherein the spacer is aligned with the inlet, and wherein the spacer inhibits the desiccant bag from being aligned with the inlet;
    wherein the spacer includes a head having a plurality of head segments biased in a spaced-apart relationship from one another in a normal configuration, and compressed toward one another in a compressed configuration.

9. The receiver drier assembly of claim 8, wherein the head segments are tapered such that the head gets narrower toward a tip of the head.

10. The receiver drier assembly of claim 8, wherein the spacer includes a plurality of fins, each fin located between a respective pair of the head segments.

11. The receiver drier assembly of claim 10, wherein the fins join together at a center shaft.

12. The receiver drier assembly of claim 8, wherein the spacer includes a plurality of legs, each leg having a first leg member that extends to a first of the head segments, and a second leg member that extends to second of the head segments that is adjacent the first of the head segments.

13. The receiver drier assembly of claim 12, further comprising a ring disposed about the legs, wherein the ring is configured to slide along the legs to alter the spacer from the normal configuration to the compressed configuration.

14. The receiver drier assembly of claim 8, wherein the spacer includes a bottom end that contacts the cap assembly and a top end that contacts the desiccant bag.

15. A method of assembling a receiver drier for an automotive HVAC, the method comprising:
    brazing or welding a thread within a modulator; then
    inserting a desiccant bag through the thread and into the modulator; then inserting a compressed spacer through the thread and into the modulator; then allowing the compressed spacer to expand within the modulator; and then inserting a plastic cap assembly through the thread.

16. The method of claim 15, wherein the modulator includes an inlet and an outlet, wherein the step of inserting the compressed spacer inhibits the desiccant bag from contacting the inlet.

17. The method of claim 15, further comprising, prior to the step of inserting the compressed spacer, assembling a ring about legs of the spacer.

18. The method of claim 17, further comprising sliding the ring along the legs of the spacer to compress the spacer.

* * * * *